United States Patent
Nadaud et al.

(10) Patent No.: US 10,301,712 B2
(45) Date of Patent: May 28, 2019

(54) PROCESS FOR OBTAINING A SUBSTRATE PROVIDED WITH A COATING

(71) Applicant: SAINT-GOBAIN GLASS FRANCE, Courbevoie (FR)

(72) Inventors: Nicolas Nadaud, Paris (FR); Emmanuel Mimoun, Paris (FR); Brice Dubost, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 34 days.

(21) Appl. No.: 14/893,421

(22) PCT Filed: May 21, 2014

(86) PCT No.: PCT/FR2014/051193
§ 371 (c)(1),
(2) Date: Nov. 23, 2015

(87) PCT Pub. No.: WO2014/188127
PCT Pub. Date: Nov. 27, 2014

(65) Prior Publication Data
US 2016/0168679 A1 Jun. 16, 2016

(30) Foreign Application Priority Data

May 24, 2013 (FR) ..................................... 13 54730

(51) Int. Cl.
*C22F 1/00* (2006.01)
*C22F 1/18* (2006.01)
(Continued)

(52) U.S. Cl.
CPC .......... *C22F 1/183* (2013.01); *B23K 26/0006* (2013.01); *B23K 26/0604* (2013.01);
(Continued)

(58) Field of Classification Search
CPC .. B23K 26/00; C21D 1/00; C21D 9/00; C22F 1/00
See application file for complete search history.

(56) References Cited

U.S. PATENT DOCUMENTS 4,309,225 A * 1/1982 Fan .......................... C30B 1/023
117/8
4,642,582 A * 2/1987 O'Meara ................ G02F 1/3534
359/244

(Continued)

FOREIGN PATENT DOCUMENTS

EP 0 959 051 A1 11/1999
WO WO 99/54961 A1 10/1999
(Continued)

OTHER PUBLICATIONS

"Simultaneous machining of parallel grooves in SnO2 thin films using a Nd:YAG laser and a kinoform", Anna-Karin Holmer, Applied Optics, vol. 35, No. 15, May 20, 1996.*
(Continued)

*Primary Examiner* — David P Turocy
*Assistant Examiner* — Mohammad Mayy
(74) *Attorney, Agent, or Firm* — Pillsbury Winthrop Shaw Pittman LLP

(57) ABSTRACT

A process for obtaining a substrate provided with a coating, in which the coating includes a pattern with spatial modulation of at least one property of the coating, includes performing a heat treatment, using a laser radiation, of a continuous coating deposited on the substrate. The heat treatment is such that the substrate is irradiated with the laser radiation focused on the coating in the form of at least one laser line, keeping the coating continuous and without melting of the coating, and a relative displacement of the substrate and of the laser line focused on the coating is imposed in a direction transverse to the longitudinal direc- (Continued)

tion of the laser line, while temporally modulating during this relative displacement the power of the laser line as a function of the speed of relative displacement and of the dimensions of the pattern in the direction of relative displacement.

22 Claims, 2 Drawing Sheets

(51) Int. Cl.
| | |
|---|---|
| B23K 26/06 | (2014.01) |
| B23K 26/073 | (2006.01) |
| B23K 26/08 | (2014.01) |
| B23K 26/00 | (2014.01) |
| B23K 26/0622 | (2014.01) |
| C03C 17/09 | (2006.01) |
| B23K 26/064 | (2014.01) |
| B23K 26/352 | (2014.01) |
| C21D 1/34 | (2006.01) |
| C21D 9/00 | (2006.01) |
| B23K 103/00 | (2006.01) |

(52) U.S. Cl.
CPC ........ *B23K 26/064* (2015.10); *B23K 26/0624* (2015.10); *B23K 26/0626* (2013.01); *B23K 26/0738* (2013.01); *B23K 26/08* (2013.01); *B23K 26/352* (2015.10); *C03C 17/09* (2013.01); *C21D 1/34* (2013.01); *C21D 9/0068* (2013.01); *B23K 2103/50* (2018.08); *C03C 2217/258* (2013.01); *C03C 2218/328* (2013.01)

(56) References Cited

U.S. PATENT DOCUMENTS

| | | | | |
|---|---|---|---|---|
| 5,539,761 | A * | 7/1996 | Golub | B82Y 10/00 |
| | | | | 372/38.02 |
| 7,834,353 | B2 * | 11/2010 | Hongo | B23K 26/0648 |
| | | | | 257/59 |
| 9,011,649 | B2 * | 4/2015 | Kharchenko | C03C 17/002 |
| | | | | 204/192.15 |
| 2005/0141900 | A1 * | 6/2005 | Pocholle | H04B 10/1121 |
| | | | | 398/186 |
| 2008/0018943 | A1 * | 1/2008 | Eyal | B23K 26/0608 |
| | | | | 358/3.29 |
| 2012/0249998 | A1 * | 10/2012 | Eisele | G01C 3/08 |
| | | | | 356/5.01 |
| 2013/0003343 | A1 * | 1/2013 | Sudarshanam | G02B 27/48 |
| | | | | 362/19 |
| 2013/0337191 | A1 * | 12/2013 | Ramanujan | B41J 3/407 |
| | | | | 427/559 |

FOREIGN PATENT DOCUMENTS

| | | | |
|---|---|---|---|
| WO | WO2011/039488 A1 * | 4/2011 | |
| WO | WO 2012/066324 A1 | 5/2012 | |

OTHER PUBLICATIONS

International Search Report as issued in International Patent Application No. PCT/FR2014/051193, dated Aug. 20, 2014.

Holmér, Anna-Karin, "Simultaneous machining of parallel grooves in $SnO_2$ thin films using a Nd: YAG laser and a kinoform," Applied Optics, vol. 35, No. 15, May 20, 1996, pp. 2614-2618.

* cited by examiner

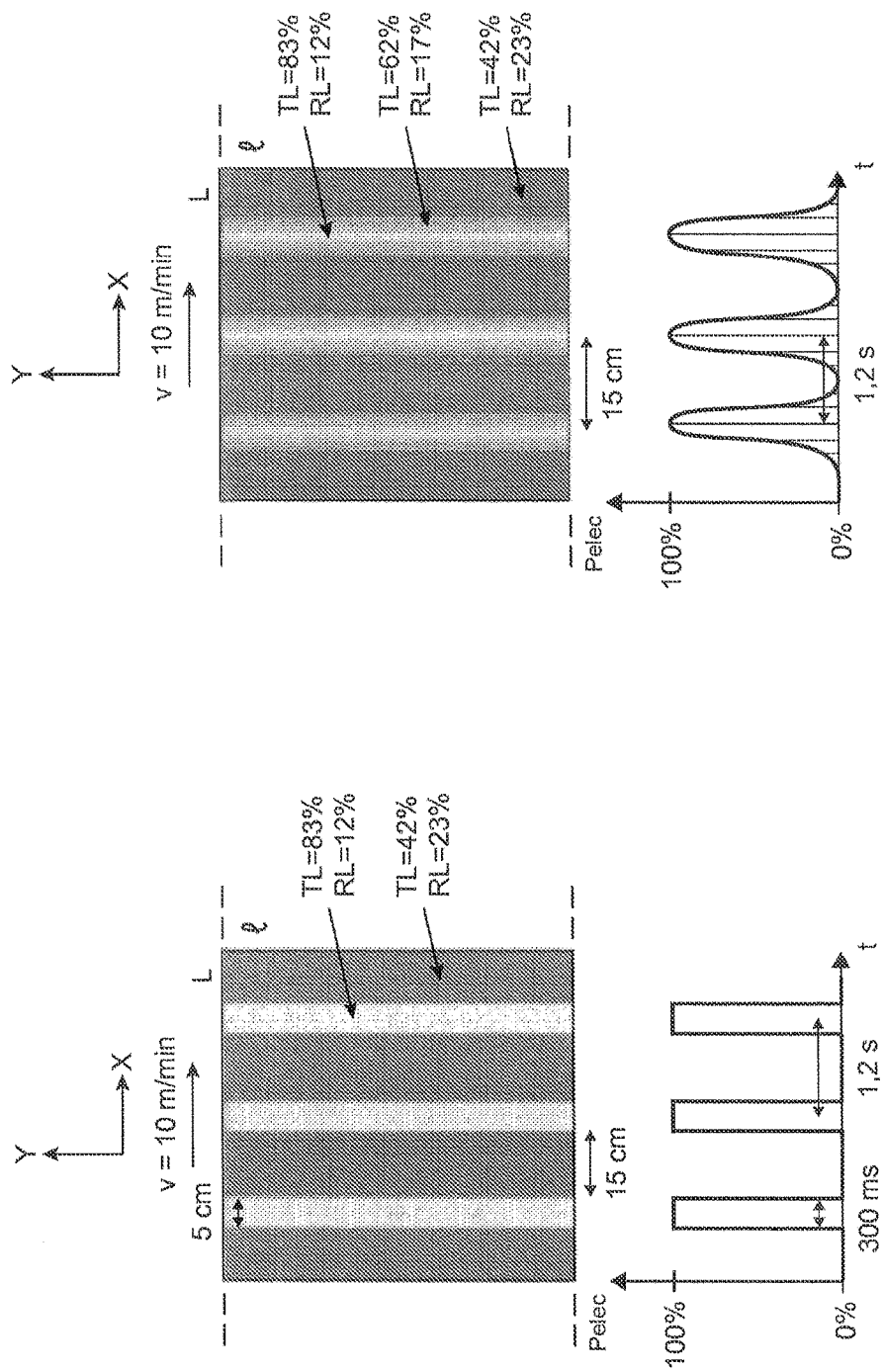

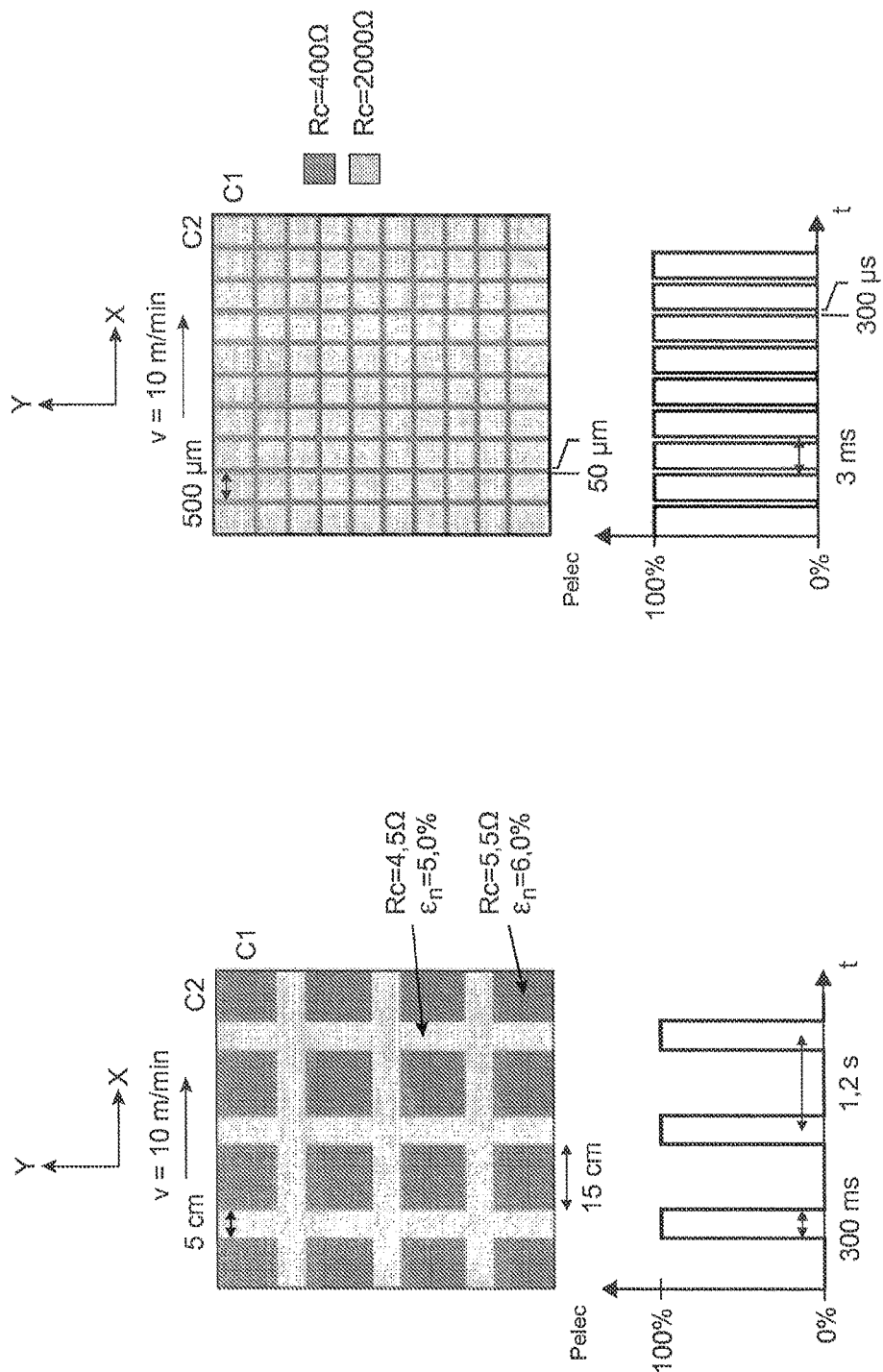

though the thickness is less than a micrometer and generally ranges from a few nanometers to a few hundred nanometers, hence the term "thin".

PROCESS FOR OBTAINING A SUBSTRATE PROVIDED WITH A COATING

CROSS-REFERENCE TO RELATED APPLICATIONS

This application is the U.S. National Stage of PCT/FR2014/051193, filed May 21, 2014, which in turn claims priority to French patent application number 1354730 filed May 24, 2013. The content of these applications are incorporated herein by reference in their entireties.

The present invention relates to a process for obtaining a substrate provided, on at least part of at least one of its faces, with a coating comprising a pattern with spatial modulation of at least one property of the coating. The invention also relates to an apparatus for treating a substrate provided with at least one coating, in order to create a pattern with spatial modulation of at least one property of the coating, and to a substrate provided, on at least part of at least one of its faces, with a coating comprising a pattern with spatial modulation of at least one property of the coating.

It is conventional to provide substrates, especially made of glass or of organic polymer material, with coatings that give them particular properties, especially optical properties, for example of radiation reflection or absorption in a given wavelength range, electrical conduction properties, or properties associated with the ease of cleaning or with the capacity for self-cleaning of the substrate.

These coatings, which may be monolayer or multilayer, are generally based on mineral compounds, especially metals, oxides, nitrides or carbides. These coatings may be thin layers or stacks of thin layers. For the purposes of the invention, the term "thin layer" means a layer whose thickness is less than a micrometer and generally ranges from a few nanometers to a few hundred nanometers, hence the term "thin".

As examples of coatings that give substrates particular properties, mention may be made of:

coatings which modify the reflection properties of the substrate in the visible wavelength range, such as reflective metallic coatings, especially based on silver metal, which are used for forming mirrors, or alternatively anti-reflective coatings, which are aimed at reducing radiation reflection at the interface between the air and the substrate. An anti-reflection coating may be formed, especially, by a layer with a refractive index between the refractive index of air and the refractive index of the substrate, such as a thin layer or a porous layer of sol-gel type; or by a stack of thin layers having alternately lower and higher refractive indices, acting as interference filter at the interface between the air and the substrate; or alternatively a stack of thin layers having a continuous or staged gradient of refractive indices between the refractive index of air and that of the substrate;

coatings which give the substrate infrared radiation reflection properties, such as transparent coatings comprising at least one metallic thin layer, especially based on silver. These metallic thin-layer transparent coatings are used for forming solar control glazing, in particular anti-solar glazing, aimed at reducing the amount of entering solar energy, or low-emissivity glazing, aimed at reducing the amount of energy dissipated out from a building or a vehicle;

coatings which give the substrate electrical conduction properties, such as coatings comprising at least one metallic thin layer, especially based on silver, or thin layers based on transparent electrically conductive oxides (TCO), for example based on mixed oxides of indium and tin (ITO), based on mixed oxides of indium and zinc (IZO), based on zinc oxide doped with gallium or with aluminium, based on titanium oxide doped with niobium, based on cadmium or zinc stannate, based on tin oxide doped with fluorine and/or with antimony. These coatings with electrical conduction properties are used especially in heating glazing, in which an electrical current is passed through the coating so as to generate heat via the Joule effect, or alternatively as an electrode in electronic layered devices, in particular as a transparent electrode located on the front face of organic light-emitting diode devices (OLED), photovoltaic devices or electrochromic devices;

coatings which give the substrate self-cleaning properties, such as thin layers based on titanium oxide, which facilitate the degradation of organic compounds under the action of ultraviolet radiations and eliminate mineral soiling under the action of a stream of water.

For certain applications, it is desirable to locally modify, for example periodically, the properties of a coating deposited on a substrate so as to obtain a pattern with spatial modulation of the properties of the coating, whether they are optical properties, electrical conduction properties or the like. In particular, a modulation of the optical properties of the coating may be sought so as to modify the visual aspect of the coated substrate, for aesthetic or functional purposes. For example, glazing whose coating comprises a colour gradient in reflection, or any other pattern with modulation of the colour in reflection, may be used as decorative glass for interior or exterior applications. Similarly, glazing alternating transparent zones with reflective and/or absorbent zones may be used as decorative glass, or as a partition, especially for open offices of "open space" type, making it possible to define private spaces at the level of the non-transparent zones of the glazing, while at the same time maintaining good light transmission in the transparent zones.

Modulation of the optical properties of the coating may also make it possible to adjust the optical response of the coated substrate towards certain radiations, and thus the performance qualities of the substrate. For example, solar-control glazing whose coating comprises an openwork pattern of reflection of infrared rays makes it possible to control the gain in solar heat.

Beyond modulation of the optical properties, modulation of the electrical conduction properties of the coating may be sought, in order to create a pattern or specific conductivity mapping on the substrate. For example, glazing comprising a conductive grid on its surface may be used as an electrode for an electronic layer device, especially as a transparent electrode when the spaces between the lattices of the grid are transparent, or as heating glazing, or alternatively may act as a transparent equipotential surface of Faraday cage type.

In practice, it is complicated to integrate a pattern with modulation of a property of a coating during the deposition thereof, especially in the context of industrial processes. In particular, although, at the present time, it is relatively easy to deposit thin layers onto large surfaces of substrate, especially by magnetic field-assisted cathodic sputtering, also known as the "magnetron" process, it remains difficult to spatially modulate the properties of these thin layers by acting on the deposition conditions. The use of masks during the deposition of layers onto a substrate via the magnetron process poses problems, especially for maintaining the cleanliness of the substrate, which limits its implementation at the industrial scale.

Various techniques moreover exist for forming a pattern on a coating, once it has been deposited onto a substrate. A first known technique is laser patterning, in which ablation or vaporization of at least part of the coating is performed by scanning with a point laser beam. This technique is, however, a local, slow technique, which is difficult to implement for large sizes of substrates and which imposes a relatively low production rate. Another known technique is screen printing, which makes it possible to opacify part of the substrate by deposition of an enamel through a printing screen or by digital printing. The screen printing technique is, however, limited in resolution and requires a heat treatment of the substrate at a temperature of at least 600° C. in order to ensure the stability of the enameled product, which is detrimental. In yet another known technique, a mask of resin, which is, for example, photosensitive, is integrated by lithography or screen printing onto the coating to be treated, followed by ablation or oxidation of the portion of coating not protected by the mask of resin. This technique has the drawback of being a slow and expensive process, which involves several steps.

It is these drawbacks which the invention more particularly intends to solve, by proposing a process for obtaining a substrate provided with a coating comprising a pattern with spatial modulation of at least one property of the coating, which is economical, simple and also rapid, and which makes it possible to achieve high production rates, this process ensuring a high level of resolution for the modulation of the properties of the coating and being applicable even for large sizes of substrates, this process also being particularly flexible so as to allow, on a production line, rapid changes in the spatial structure of the properties of the coating for the same substrate or from one substrate to another.

To this end, a subject of the invention is a process for obtaining a substrate provided, on at least part of at least one of its faces, with a coating comprising a pattern with spatial modulation of at least one property of the coating, characterized in that it comprises a step of heat treatment, using a laser radiation, of a continuous coating deposited on the substrate, in which the coating before heat treatment at least partially absorbs the laser radiation, this heat treatment step being such that the substrate is irradiated with the laser radiation focused on the coating in the form of at least one laser line, keeping the coating continuous and without melting the coating, and a relative displacement of the substrate and of the laser line focused on the coating is imposed in a direction transverse to the longitudinal direction of the laser line, while temporally modulating during this relative displacement the power of the laser line as a function of the speed of the relative displacement and of the dimensions of the pattern in the relative displacement direction.

In the context of the invention, a "laser line" is a laser beam focused in the form of a line having a greater longitudinal dimension than its transverse dimension, which is generated by one or several laser sources and of which all the points, in the longitudinal direction of the line, are illuminated simultaneously by the laser source(s). Thus, the laser line is obtained by irradiation at the same time of the entire surface of the line by the laser source(s).

For the purposes of the invention, one direction is transverse to another direction when it forms a non-zero angle with this other direction. Furthermore, for the purposes of the invention, a coating present on part of a face of a substrate is continuous when it covers substantially all of this part. According to the invention, this continuous nature of the coating is preserved during the heat treatment step.

When a coating deposited on a substrate is irradiated with a laser beam, in which the coating at least partially absorbs the laser radiation, energy sufficient to bring about a modification of the crystalline and/or chemical nature of the coating is supplied. Specifically, the supplied energy promotes the crystallization of the coating, via a physicochemical mechanism of crystal growth around nuclei already present in the coating, while remaining in the solid phase. The supplied energy also promotes, when the coating is in contact with an oxidative or non-oxidative reactive atmosphere, a change in the chemical composition of the coating, for example by oxidation of the coating in the presence of an oxidative atmosphere, or alternatively by nitridation of the coating in the presence of a nitrogenous atmosphere. This modification of the crystalline and/or chemical nature of the coating generally induces a change in at least one property of the coating, especially among the electrical conductivity, the emissivity, the transmission of radiation (especially in the visible and/or infrared range), the reflection of radiation (especially in the visible and/or infrared range), the absorption of radiation (especially in the visible and/or infrared range), the haze in transmission and/or in reflection, the colorimetric coordinates in reflection and/or in transmission, the hydrophilicity, or alternatively the photocatalytic activity of the coating.

The inventors have exploited these effects of laser irradiation on the coating to form a pattern with modulation of at least one property of the coating. In practice, the pattern is obtained according to the invention by focusing on the coating at least one laser line having a suitable intensity in the focal plane, and by modulating over time the power of this laser line while the substrate and the laser line are in relative displacement. As the power of the laser line changes over time, the property or properties of the coating are spatially modulated during the relative displacement.

The process according to the invention makes it possible to create, in the coating, any type of pattern with modulation of at least one property of the coating, by adjusting the temporal modulation of the power of the laser line as a function of the speed of relative displacement between the substrate and the laser line and of the spatial structure of the desired pattern. Advantageously, this process is applicable to substrates of all dimensions, including large dimensions, the length of the laser line being able to be simply adapted to correspond to the size of the desired pattern. The process makes it possible to create in the coating small-sized patterns, of the order of a few tens of micrometers, which is difficult to achieve with other global treatment methods such as screen printing. The temporal modulation of the power of the laser line may be particularly rapid, which makes it possible to achieve both high levels of resolution and high production rates. Thanks to the invention, it is possible to quickly obtain a pattern with modulation of at least one property of the coating, even for large sizes of substrates, which is not the case by scanning with a point laser beam as used for laser patterning. In addition, by virtue of the possibility of rapidly modulating the power of the laser line, the process according to the invention makes it possible, on a production line, to effect rapid changes in the spatial structure of modulation of the properties of the coating, whether for the same substrate or from one substrate to another on the line.

It should be noted that the process according to the invention does not involve a mechanism of crystallization by cooling starting from a molten material, since this would make it necessary to bring the coating to extremely high temperatures in order to melt it. Advantageously, the heat treatment step according to the invention heats only the coating, without significant heating of the entire substrate, which makes the process applicable to substrates made of polymeric organic material. Furthermore, in the case of glass substrates, it is therefore no longer necessary to perform slow, controlled cooling of the substrate before cutting or storing the glass.

The substrate is preferably a sheet of glass, of vitroceramic or of a polymeric organic material. It is preferably transparent, colourless or coloured. The glass is preferably of silico-sodio-calcic type, but it may also be made of glass of borosilicate or alumino-borosilicate type. The preferred polymeric organic materials are polycarbonate, polymethyl methacrylate, polyethylene terephthalate (PET), polyethylene naphthalate (PEN), or fluoropolymers such as ethylenetetrafluoroethylene (ETFE). The substrate may be flat or curved, or even flexible.

The substrate advantageously has at least one dimension larger than or equal to 1 m, or even 2 m and even 3 m. Preferably, the surface area of the main faces of the substrate is greater than or equal to 1 m$^2$, more preferably greater than or equal to 1.4 m$^2$. In an advantageous embodiment, the treated substrate is a parallelepiped having a length of 1.3 m and a width of 1.1 m. In the case of a glass substrate, the thickness of the substrate generally ranges between 0.5 mm and 19 mm, preferably between 0.7 mm and 9 mm, especially between 2 mm and 8 mm, or even between 4 mm and 6 mm. Substrates made of polymeric organic material may have markedly lower thicknesses, for example between 25 and 100 μm.

In the case of a glass substrate, it is preferably of the floated type, i.e. it may have been obtained via a process consisting in pouring the molten glass onto a bath of molten tin ("float" bath). In this case, the coating to which the heat treatment according to the invention is applied may be deposited either on the "tin" face or on the "atmosphere" face of the substrate. The terms "atmosphere" and "tin" faces mean the faces of the substrate which have been in contact, respectively, with the atmosphere prevailing in the float bath and in contact with the molten tin. The tin face contains a small surface amount of tin which has diffused into the structure of the glass. The glass substrate may also be obtained by rolling between two rolls, this technique making it possible in particular to print patterns on the surface of the glass.

The coating to which the heat treatment according to the invention is applied may be monolayer or multilayer, in particular formed by a stack of thin layers. When the coating is a stack of layers, at least one constituent layer of the coating at least partially absorbs the laser radiation. Preferably, the absorption of at least one constituent layer of the coating at the wavelength of the laser radiation is greater than or equal to 20% and especially 30%. The absorption of a layer is defined as being equal to the value of 100% from which are subtracted the transmission and reflection of the layer. In the context of the invention, during the heat treatment, only one layer of the coating may be treated, or several layers of the coating may be treated. Thus, the process according to the invention makes it possible to generate spatial modulation of the properties of one or more constituent layers of the coating.

The heat treatment step according to the invention is such that the temperature of the face of the substrate opposite the face bearing the treated coating does not exceed 150° C. during the treatment. Preferably, the temperature of the substrate during the heat treatment is less than or equal to 100° C., especially 50° C. and even 30° C. It is especially the temperature at the face of the substrate opposite the face on which the treated coating is deposited. This temperature may be measured, for example, by pyrometry.

This characteristic is due to the fact that a heat treatment performed using a laser radiation has a very high coefficient of heat exchange, above 400 W/(m$^2$·s). Preferably, the mean power per unit area of the laser line is greater than or equal to 10$^3$ W/cm$^2$, especially greater than or equal to 10$^3$ W/cm$^2$ when it is generated using a pulsed laser source, and greater than or equal to 10$^4$ W/cm$^2$ when it is generated using a laser source operating in continuous mode (continuous wave, or CW) or quasi-continuous mode (quasi continuous wave, or QCW). This high energy density makes it possible very rapidly to reach the desired temperature on the treated coating, in general in a time of less than or equal to one second, especially of the order of a millisecond or a tenth of a millisecond, and consequently to proportionally limit the duration of the treatment, the generated heat then not having the time to diffuse into the substrate.

The or each constituent layer of the coating is preferably a thin layer based on at least one metal, metalloid, oxide, nitride, carbide or sulfide, or any mixture thereof, chosen especially from titanium, tin, zirconium, vanadium, zinc, tungsten, tantalum, niobium, molybdenum, yttrium, chromium, manganese, iron, cobalt, nickel, silicon, boron, copper, indium, gold, silver, aluminium, an alloy of metals chosen from the preceding list, titanium oxide, mixed oxides of indium and zinc or tin, zinc oxide doped with aluminium or with gallium, titanium, aluminium or zirconium nitrides, titanium oxide doped with niobium, cadmium and/or tin stannate, tin oxide doped with fluorine and/or with antimony. Preferably, the or each constituent layer of the coating is a thin layer consisting of a metal, metalloid, oxide, nitride, carbide or sulfide, or any mixture thereof.

For most of the layers listed above, the laser irradiation makes it possible to modify at least one property of the layer by bringing about a change in the crystallization state of the layer.

More precisely, the laser irradiation makes it possible to locally increase the degree of crystallization of the layer, i.e. the mass or volume proportion of crystalline material, and the size of the crystalline grains (or the size of the coherent diffraction domains measured by X-ray diffraction methods), or even in certain cases to produce a particular crystallographic form.

The silver layers with a high degree of crystallization, and consequently a low residual content of amorphous silver, have lower emissivity and resistivity than silver layers that are predominantly amorphous. The heat treatment according to the invention, applied to a substrate coated with at least one layer of silver, with a relative movement between the substrate and the laser line and a suitable temporal modulation of the power of the laser line, thus makes it possible to create a pattern with spatial modulation of the electrical conductivity and/or of the emissivity of the silver layer.

Similarly, the layers based on transparent electrically conductive oxides (TCO) have electrical conductivity that is proportionately higher the higher their degree of crystallization. The heat treatment according to the invention, applied to a substrate coated with at least one layer based on TCO, with a relative movement between the substrate and the laser line and suitable temporal modulation of the power of the laser line, thus makes it possible to create a pattern with spatial modulation of the electrical conductivity of the TCO layer.

In the case of solar-control or low-emissivity glazing, the coating generally comprises at least one thin layer based on silver deposited between two thin dielectric layers based on oxide or nitride. A very thin layer intended to promote the wetting and nucleation of the silver, for example made of zinc oxide ZnO, may also be placed under the silver layer, and a second very thin, sacrificial, layer, for example made of titanium, may be placed over the silver layer, which is intended to protect the silver layer in the case where the deposition of the subsequent layer is performed under an oxidative atmosphere or in the case of heat treatments leading to migration of oxygen in the stack. The stacks may also comprise several layers of silver, each of these layers generally being affected by the implementation of the heat treatment according to the invention. When the stack comprises a layer of zinc oxide, the treatment of the silver layer is also generally accompanied by an increase in the degree of crystallization of the zinc oxide.

In the case of titanium oxide, it is known that titanium oxide crystallized in anatase form is much more efficient in terms of degradation of organic compounds than amorphous titanium oxide or titanium oxide crystallized in rutile or brookite form. The coating based on titanium oxide is preferably a layer made of optionally doped titanium oxide. The entire surface of this layer is preferably in contact with the exterior, so that the titanium oxide can fully exert its self-cleaning function. In order to further improve the crystallization, the coating may comprise, under the layer based on titanium oxide, a sub-layer which has the effect of promoting the crystalline growth of the titanium oxide, especially in anatase form.

For most of the layers listed previously, the laser irradiation may also make it possible, when the layer is in contact with a reactive atmosphere, to modify at least one property of the layer by bringing about a change in the chemical composition of the layer.

Thus, when the treated layer is a layer of a material chosen from a metal M, an oxygen-substoichiometric oxide of the metal M, a nitride of the metal M, a carbide of the metal M, a sulfide of the metal M, and this layer is in contact with an oxidative atmosphere, the laser irradiation makes it possible locally to obtain partial oxidation of the layer. The oxidative atmosphere is preferably air, especially at atmospheric pressure. If need be, the oxygen content of the atmosphere can be increased so as to further promote the oxidation of the layer.

In certain cases, the metal or nitride layers are more reflective or absorbent in the visible range than the corresponding oxide layers. The heat treatment according to the invention, applied to a substrate coated with at least one metal or nitride layer while the layer is in contact with an oxidative atmosphere, with a relative movement between the substrate and the laser line and suitable temporal modulation of the power of the laser line, then makes it possible to create a pattern with spatial modulation of the light reflection or of the light absorption of the layer. This makes it possible to obtain alternating transparent zones and reflective or absorbent zones, distributed in a predefined design, with the possibility of having light transmission or light reflection gradients.

Similarly, the metal layers are electrically conductive, whereas the oxide layers are insulating. The heat treatment according to the invention, applied to a substrate coated with at least one metal layer while the layer is in contact with an oxidative atmosphere, with a relative movement between the substrate and the laser line and suitable temporal modulation of the power of the laser line, thus makes it possible to create a pattern with spatial modulation of the electrical conductivity of the layer. This makes it possible to obtain conductive zones, and thus electrodes, in a predefined design, for example in the form of strips or grids. It is thus possible to create transparent printed circuits, for example by locally oxidizing conductive layers made of aluminium or semiconductive layers made of silicon.

Moreover, when the treated layer is a layer of a material chosen from a metal M, an oxide of the metal M, a nitrogen-substoichiometric nitride of the metal M, a carbide of the metal M, a sulfide of the metal M, and this layer is in contact with a non-oxidative nitrogenous atmosphere, the laser irradiation makes it possible locally to obtain partial nitridation of the layer. To perform such a partial nitridation, the reagent gas may be chosen especially from $N_2$, $N_2O$, $NH_3$ or NOx.

More generally, when the treated layer is a layer of a material chosen from a metal M, an oxide of the metal M, a nitride of the metal M, a carbide of the metal M, a sulfide of the metal M, and this layer is in contact with a non-oxidative reactive atmosphere, it is possible locally to modify the chemical composition of the layer via reactions other than oxidation or nitridation, for example via a partial hydrogenation of the layer, especially with $SiH_4$ as reagent gas, or alternatively via a partial carbidation of the layer under a carbon-based atmosphere, especially with ethylene $C_2H_2$ or methane $CH_4$ as reagent gases. The term "non-oxidative reactive atmosphere" means herein that the atmosphere consists of at least one reagent gas which brings about a reaction with the constituent elements of the layer, the reaction not being an oxidation of the layer. Such an atmosphere is not, however, necessarily free of oxygen, and traces of oxygen may possibly be present.

Preferably, the laser line used in the heat treatment step according to the invention is generated by modules comprising one or more laser sources, and also shaping and redirecting optics.

The laser sources are conventionally laser diodes, or fiber or disc lasers. Laser diodes make it possible economically to achieve high power densities relative to the electrical supply power, for little bulk. The bulk of fiber lasers is even smaller, and the power per unit length obtained may be even higher, for a cost that is, however, higher.

The terms "fiberized lasers" mean lasers in which the location where the laser light is generated is spatially offset with respect to the location where the laser light is supplied, the laser light being supplied by means of at least one optical fiber.

In the case of a disc laser, the laser light is generated in a resonant cavity in which is located the emitting medium which is in the form of a disc, such as a thin disc (about 0.1 mm thick) of Yb:YAG. The light thus generated is coupled into one or more optical fibers which are directed towards the treatment site.

The wavelength of the radiation of the or each laser line is advantageously in a range from 100 nm to 2000 nm, especially from 100 to 350 nm or from 800 to 1000 nm. Depending on the absorption spectrum of the treated coating, it may be appropriate to use power laser diodes emitting at a wavelength chosen from 808 nm, 880 nm, 915 nm, 940 nm or 980 nm, or alternatively excimer lasers emitting a radiation in the ultraviolet range, between 100 nm and 350 nm, especially between 240 nm and 300 nm. As a variant, the wavelength of the radiation of the or each laser line may be within a range from 5 μm to 15 μm, which may be obtained using $CO_2$ lasers, for coatings absorbing such a radiation. In the case of a disc laser, the wavelength is for example 1030 nm (emission wavelength for a Yb:YAG laser). For a fiber laser, the wavelength is for example 1070 nm.

In the case of non-fiberized laser sources, the shaping and redirecting optics preferably comprise lenses and mirrors, and are used as means for positioning, homogenizing and focusing the radiation. The positioning means have the function of arranging in a line the radiation emitted by the laser sources. They preferably comprise mirrors. The homogenizing means have the function of superposing the spatial profiles of the laser sources so as to obtain a homogeneous power per unit length throughout the line. The homogenizing means preferably comprise lenses for separating the incident beams into secondary beams and for recombining the said secondary beams into a homogeneous line. The radiation focusing means make it possible to focus the radiation on the coating to be treated, in the form of a line having the desired length and width. The focusing means preferably comprise a convergent lens.

In the case of fiberized laser sources, the shaping optics are preferably grouped in the form of an optical head positioned at the output of the or each optical fiber. The shaping optics of said optical heads preferably comprise lenses, mirrors and prisms, and are used as means for transforming, homogenizing and focusing the radiation. The transforming means comprise mirrors and/or prisms and are used to transform the circular beam, obtained at the output of the optical fiber, in an anisotropic noncircular beam in the shape of a line. To this end, the transforming means increase the quality of the beam in one of its axes (fast axis, or width axis of the laser line) and reduce the quality of the beam in the other (slow axis, or length axis of the laser line). The homogenizing means superpose the spatial profiles of the laser sources in order to obtain a homogeneous power per unit length all the way along the line. The homogenizing means preferably comprise lenses allowing the incident beams to be separated into secondary beams and said secondary beams to be recombined into a homogeneous line. Finally, the focusing means for focusing the radiation make it possible to focus the radiation at the working plane, namely in the plane of the coating to be treated, in the form of a line of desired width and length. The focusing means preferably comprise a focusing mirror or a convergent lens.

The shaping and redirecting optics, especially the positioning means, may be adjusted manually or with the aid of actuators for regulating their position remotely. These actuators, which are generally motors or piezoelectric transducers, may be controlled manually and/or regulated automatically. In the latter case, the actuators will preferably be connected to detectors, and also to a feedback loop.

At least part of the laser modules, or even all of them, is preferably arranged in a leaktight box, which is advantageously cooled, and especially ventilated, so as to ensure their heat stability.

In the context of the invention, the "length" of the laser line is understood to be the largest dimension of the laser line, i.e. the dimension of the laser line in its longitudinal direction, and the "width" of the laser line is understood to be the dimension of the laser line in a direction perpendicular to its longitudinal direction. As is common in the field of lasers, the width w of the laser line corresponds to the distance, along this perpendicular direction, between the axis of the beam, where the radiation intensity is maximal, and the point where the radiation intensity is equal to $1/e^2$ times the maximum intensity. If the longitudinal axis of the laser line is named x, a width distribution along this axis may be defined, named w(x).

According to one feature, the mean width of the or each laser line is between 10 μm and 1000 μm and preferably between 30 μm and 200 μm. Throughout this description, the term "mean" means the arithmetic mean. Over the entire length of the laser line, the width distribution is narrow so as to ensure homogeneous treatment along the laser line during the creation of the pattern into the coating. Thus, the difference between the largest width and the smallest width is preferably not more than 10%, more preferably not more than 5% and even 3% of the value of the mean width.

The length of the or each laser line is preferably at least 10 cm, preferably within a range from 20 cm or 30 cm to 3 m. The use of a single laser line is preferred for irradiating all or part of the width of the substrate. It is, however, also possible to use several laser lines arranged with their longitudinal directions parallel to each other, which may optionally be separate.

According to one feature, the laser line is such that the ratio of the length of the laser line to the average width of the laser line is greater than or equal to 10, preferably greater than or equal to 30. In a preferred embodiment, the ratio of the length of the laser line to the average width of the laser line is between 30 and 300000.

According to one advantageous feature, the longitudinal direction of the laser line is substantially perpendicular to the direction of relative displacement between the substrate and the laser line. Other orientations of the laser line relative to the direction of relative displacement are, however, also possible and, in general, the longitudinal direction of the laser line forms any non-zero angle with the direction of relative displacement.

In one embodiment, the laser line is fixed and the substrate is displaced translationally in a transverse direction relative to the longitudinal direction of the laser line. Advantageously, the substrate is displaced in a substantially horizontal plane facing the laser line.

Other embodiments are also possible. For example, the substrate may be fixed, while the laser line is displaced relative to the substrate, especially using a mobile gantry. As a variant, both the substrate and the laser line may be displaced. The relative displacement between the substrate and the laser line may also be a movement other than a translational movement, for example a rotational movement, or a combination of a translational movement and a rotational movement. The substrate may also be displaced in a plane that is not horizontal, for example a vertical plane, or in any other orientation.

When the substrate is displaced, especially in translation, it may be placed in movement via any mechanical conveying means, for example using belts, rollers, translational trays, air cushions. The conveying system makes it possible to control and regulate the speed of the displacement. The conveying means preferably comprises a rigid chassis and a plurality of rollers. In the case of a substrate made of flexible polymeric organic material, the displacement of the substrate may be performed using a film advance system in the form of a succession of rollers. In this case, the planarity may be ensured by an appropriate choice of the distance between the rollers, taking into account the thickness of the substrate, and thus its flexibility, and the impact that the heat treatment may have on the creation of any deflection.

The laser may also be placed in movement so as to adjust its distance to the substrate, which may be useful in particular when the substrate is curved, but not only in this case. Specifically, it is preferable, for the or each laser line, for the absolute value of the distance between the focal plane of the laser line and the coating to be treated to be less than or equal to 1 mm, especially 0.5 mm, or even 0.3 mm and even 0.1 mm. If the system for displacing the substrate or the laser is not sufficiently precise regarding the distance between the focal plane and the substrate, it is preferable to be able to adjust the distance between the laser and the substrate. This adjustment may be automatic, especially regulated by means of a measurement of the distance upstream of the heat treatment.

The process according to the invention may be performed on a substrate provided with coatings on several of its faces, in particular provided with a coating on each of its two main faces. In this case, at least one coating of one of the faces or of each face is treated according to the invention. When coatings deposited on the two main faces of the substrate are treated according to the process of the invention, it is possible to treat the coatings on each face either simultaneously or successively, via identical or different techniques, in particular depending on whether the desired modification of the layers of the treated coatings is identical or different.

In one embodiment, the heat treatment step is applied simultaneously to two coatings deposited on two opposite faces of the substrate. This embodiment may be performed with two separate laser lines, each focused on one of the two coatings. As a variant, this embodiment may be performed with a single laser line which simultaneously treats the two coatings, the substrate preferably being in this case sparingly absorbent or non-absorbent at the wavelength of the laser radiation.

All the relative positions of the substrate and of the laser sources forming the laser line are possible, provided that they allow satisfactory irradiation of the coating. When the substrate is arranged horizontally, the or each laser source is generally arranged so as to irradiate the upper face and/or the lower face of the substrate. When two main faces of the substrate are to be treated, it is possible to use several laser sources located on either side of the substrate, whether the substrate is in the horizontal or vertical position, or in any inclination. These laser sources may be identical or different, and in particular their wavelengths may be different.

The speed of relative displacement between the substrate and each laser line is advantageously at least 1 m/min, especially 3 m/min or 4 m/min or 5 m/min and even 6 m/min or 7 m/min, or alternatively 8 m/min and even 9 m/min or 10 m/min. In order to limit the positional uncertainties of the substrate relative to the laser line during the creation of the pattern, the speed of relative displacement between the substrate and each laser line varies during the treatment by not more than 10 rel %, especially 2% and even 1% relative to its nominal value.

According to one advantageous feature, the temporal modulation of the power of the laser line is obtained by temporally modulating the input electrical signal of the laser source(s) forming the laser line. For the purposes of the invention, the term "input electrical signal of a laser source" means either the electrical supply current of the laser source, or the electrical supply power of the laser source.

The response time to obtain the temporal modulation of the power of the laser line from a temporal modulation of the input electrical signal of the laser source(s) forming the laser line is more or less long, and depends on the turn-on and turn-off time of the or each laser source. Consequently, the resolution that can be achieved with the process according to the invention, i.e. the smallest dimension of pattern that can be obtained in the direction of relative displacement, is determined by the turn-on and turn-off time of the or each laser source, by the speed of relative displacement between the substrate and the laser line, and by the width of the laser line. The turn-on and turn-off time of a laser source is defined as the time necessary to pass from 10% to 90% (or vice versa) of the nominal value of the power emitted by the source, of the envelope of the power in the case of a pulsed laser source. Thus, for laser sources whose turn-on and turn-off time is of the order of 100 µs, it is possible to obtain patterns whose dimension in the direction of relative displacement is of the order of 50 µm. For laser sources whose turn-on and turn-off time is of the order of 2 ms, it is possible to obtain patterns whose dimension in the direction of relative displacement is of the order of 1 mm. For laser sources whose turn-on and turn-off time is of the order of 20 ms, it is possible to obtain patterns whose dimension in the direction of relative displacement is of the order of 1 cm. It is possible to limit the influence of the turn-on and turn-off times of the laser sources by modulating the power emitted by the sources without turning them off completely.

In one embodiment of the invention, a pattern with modulation of at least one property of the coating which has a spatial periodicity is obtained by imposing a temporal modulation of the input electrical signal of the laser source with a frequency equal to the ratio of the speed of relative displacement between the substrate and the laser line to the period of the pattern.

In another embodiment of the invention, a pattern with modulation of at least one property of the coating without spatial periodicity is obtained by varying the temporal modulation of the input electrical signal of the laser source during the relative displacement of the substrate and of the laser line.

Advantageously, when the laser line is formed using several independent laser sources, the temporal modulation of the input electrical signal may be different from one laser source to another forming the laser line. It is thus possible to adjust locally the power along the laser line, which allows modulation of at least one property of the coating also in the longitudinal direction of the laser line. This makes it possible to gain further flexibility in the spatial modulation of the properties of the coating.

According to a preferential feature already mentioned, the power per unit area of the laser line in the focal plane is greater than or equal to $10^3$ W/cm$^2$. This power may be generated using a laser source of high power per unit length, especially greater than 10 W/mm, operating in continuous mode (continuous wave or CW) or quasi-continuous mode (quasi continuous wave or QCW), or by using a pulsed laser source of lower mean power, especially less than 100 mW/mm. In the case of a pulsed laser source, the process for treating the substrate is more efficient since the heat diffusion does not have time to take place. The power of the laser line in the focal plane must be adjusted taking into account this heat diffusion effect.

In one embodiment, the or each laser source forming the laser line is a continuous or quasi-continuous source.

In another embodiment, the or each laser source forming the laser line is a pulsed source. In this case, the power of the emitted pulses is temporally modulated. When the radiation is pulsed, the repeat frequency is advantageously at least 10 kHz, especially 15 kHz and even 20 kHz, so as to be compatible with the modulation and the speeds of displacement used.

In one embodiment, the laser line is fixed and the substrate has at least one first dimension and one second dimension which are mutually transverse, the process comprising at least one first step and one second step such that:

in the first step, the substrate is displaced translationally parallel to its first dimension and transversely to the longitudinal direction of the laser line, and the power of the laser line is temporally modulated;

in the second step, the substrate is displaced translationally parallel to its second dimension and transversely to the longitudinal direction of the laser line, and the power of the laser line is temporally modulated.

In this embodiment, the coating of the substrate undergoes at least two successive heat treatment steps, a first step in one direction and a second step in a direction transverse to the direction of the first heat treatment step. The process according to the invention thus makes it possible to structure the property or properties of the coating in a lattice, with at least two directions of creation of the lattice.

Advantageously, the process according to the invention comprises, prior to the step of heat treatment of the coating, a step of deposition of the or each layer of the coating onto the substrate. Preferably, the step of deposition of the or each thin layer of the coating is performed by magnetic field assisted cathodic sputtering (magnetron process), or by chemical vapour deposition (CVD), especially plasma-enhanced (PECVD), under vacuum or at atmospheric pressure, or via a vacuum evaporation process.

Another subject of the invention is an apparatus for the heat treatment of a substrate provided with at least one coating, in order to create in the coating a pattern with spatial modulation of at least one property of the coating, this apparatus comprising:

one or more laser sources and also shaping and redirecting optics capable of generating at least one laser line, displacement means that are capable of imposing during functioning a relative displacement of the substrate and of the laser line in a direction transverse to the longitudinal direction of the laser line, while the laser line is focused on the coating, means for temporal modulation of the power of the laser line as a function of the speed of relative displacement and of the dimensions of the pattern in the direction of relative displacement.

The heat treatment apparatus according to the invention may be integrated into a layer deposition line, for example a line for deposition by magnetic field assisted cathodic sputtering (magnetron process), or a chemical vapour deposition (CVD) line, especially a plasma-enhanced chemical vapour deposition (PECVD) line, under vacuum or at atmospheric pressure. The line generally comprises devices for handling the substrates, a deposition apparatus, optical control devices and stacking devices. The substrates pass through, for example on conveyor rolls, successively before each device or each apparatus.

The heat treatment apparatus according to the invention is preferably located just after the coating deposition apparatus, for example at the outlet of the deposition apparatus. The coated substrate may thus be treated in line after the coating deposition, at the outlet of the deposition apparatus and before the optical control devices, or after the optical control devices and before the substrate stacking devices.

The heat treatment apparatus may also be integrated into the deposition apparatus. For example, the laser may be introduced into one of the chambers of a cathodic sputtering deposition apparatus, especially into a chamber in which the atmosphere is rarefied, especially at a pressure of between $10^{-6}$ mbar and $10^{-2}$ mbar. The heat treatment device may also be located outside the deposition apparatus, but so as to treat a substrate located inside the said apparatus. To this end, it suffices to provide a porthole that is transparent to the wavelength of the radiation used, through which the laser radiation treats the coating. It is thus possible to treat a coating (for example a silver layer) before the subsequent deposition of another layer in the same apparatus.

Whether the heat treatment apparatus is outside of or integrated into the deposition apparatus, these "in line" processes are preferable to a return process in which it would be necessary to stack the glass substrates between the deposition step and the heat treatment step.

The return processes may, however, be of interest in cases where the implementation of the heat treatment according to the invention is performed in a place different from that in which the deposition is performed, for example in a place where the transformation of the glass is performed. The heat treatment apparatus may then be integrated into lines other than the layer deposition line. It may be integrated, for example, into a line for manufacturing multiple glazing, especially double or triple glazing, into a line for manufacturing laminated glazing, or alternatively into a line for manufacturing curved and/or toughened glazing. Laminated or curved or toughened glazing may be used in both building and motor vehicle glazing. In these various cases, the heat treatment according to the invention is preferably performed before making the multiple or laminated glazing. However, the heat treatment may also be performed after making the multiple glazing or the laminated glazing.

A subject of the invention is also a substrate, especially made of non-toughened glass or of a polymeric organic material, which may be obtained via the process described previously, which is provided, on at least part of at least one of its faces, with a continuous coating comprising a pattern with spatial modulation of at least one property of the coating.

According to one feature, the substrate, or the portion of the substrate which is actually provided with the continuous coating comprising the pattern with spatial modulation of at least one property of the coating, has at least one dimension larger than or equal to 0.5 m, especially 1 m or 2 m or even 3 m. Preferably, the surface area of the continuous coating, comprising the pattern with spatial modulation of at least one property of the coating, is greater than or equal to 1 $m^2$, more preferably greater than or equal to 1.4 $m^2$. In an advantageous embodiment, the treated substrate is a parallelepiped having a length of 1.3 m and a width of 1.1 m. An advantage of the invention is that a pattern with spatial modulation of at least one property of the coating can be obtained rapidly, even for large sizes of substrates, with a high level of resolution.

According to one aspect of the invention, the pattern of the coating of the substrate is made up of a series of juxtaposed lines or portions of lines, where the value of the property of the coating changes from one line to another and a characteristic dimension for the change in value of the property of the coating, taken transversely to the longitudinal direction of the lines, is a multiple of a nominal dimension of between 10 μm and 1000 μm, preferably between 10 μm and 200 μm.

In one embodiment, the pattern of the coating of the substrate is a pattern with a continuous variation of the property of the coating.

In particular, according to one feature, the pattern of the coating of the substrate is made up of a series of juxtaposed lines or portions of lines, and the value of the property of the coating continuously changes from one line to another. Then, the pattern with spatial modulation of at least one property of the coating is a pattern with a continuous variation of the property of the coating perpendicularly to the longitudinal direction of the juxtaposed lines or portions of lines of the pattern. Such a continuous variation in the property of the coating can be obtained, for example, by temporally modulating the power of the laser line according to a signal function of the sinusoidal or triangular type.

In one embodiment, the substrate is provided with at least one continuous thin layer comprising juxtaposed linear zones having different square resistance values. In another embodiment, the substrate is provided with at least one continuous thin layer comprising juxtaposed linear zones having different values of their optical and/or energetic properties. In the context of the invention, the generic term "optical and/or energetic properties" denotes the group of properties comprising radiation transmission, radiation reflection, radiation absorption, transmission and/or reflection haze, the colorimetric coordinates in reflection and/or in transmission.

Finally, a subject of the invention is the use of a substrate as described above in single, multiple or laminated glazings, mirrors, elements of interior furnishing, wall coverings, especially in the motor vehicle or building sector. The pattern of the coating may be used for decorative purposes. As a variant, the pattern of the coating may be used for functional purposes, as is the case, for example, for heating glazings, where the pattern can make it possible to improve the homogeneity of the heating intensity of the glazing, for opacifying glazings, where the pattern can make it possible to control the amount of visible light passing through the glazing, or alternatively for solar control glazings, where the pattern can make it possible to adjust the gain in solar heat. If the coating is a low-emissive stack, and in the case of a multiple glazing comprising at least two substrates separated by a gas gap, it is preferable for the stack to be arranged on the face that is in contact with the gas gap, especially on face 2 relative to the exterior, i.e. on the face of the substrate that is in contact with the exterior of the building which is opposite from the face turned toward the exterior, or face 3, i.e. on the face of the second substrate starting from the exterior of the building turned toward the exterior. If the coating is a photocatalytic layer, it is preferably arranged on face 1, i.e. in contact with the exterior of the building.

An advantageous application of the invention, for both aesthetic and functional purposes, is the integration of periodic patterns with modulation of light transmission, or of another property, in two coatings positioned on two faces of a glazing, while imposing a shift (or phase shift) between the patterns of the two coatings. By way of example, by integrating a periodic alternation of dark bands and of transparent bands on a first substrate and the same or another periodic alternation of dark bands and transparent bands on a second substrate, it is possible, by placing the two substrates facing each other, to obtain a glazing whose light transmission properties are adjustable as a function of the relative positioning of the bands of the two substrates.

Another advantageous application of the invention is the manufacture of transparent substrates, made of glass or of polymeric organic material, whose exterior edge has zero light transmission. Such transparent substrates with an opaque edge are especially sought when it is necessary to hide technical pieces positioned at the edge of the substrate, as is the case, for example, for electrochromic devices in which it is desired to dissimulate the "bus bars" present on the edges of the device. For this application, the process according to the invention constitutes a good alternative to screen printing, in particular for substrates that do not withstand high temperatures.

A subject of the invention is also the use of a substrate as described above in electronic layered devices, especially as a substrate bearing an electrode configured according to a predefined design, for example in the form of strips or a grid, which may advantageously be a transparent electrode. A substrate as described above may be used, in particular, for organic light-emitting diode (OLED) devices, photovoltaic devices, or electrochromic devices.

The characteristics and advantages of the invention will emerge in the description that follows of several implementation examples of a process and of a substrate according to the invention, which is given solely as an example and with reference to the attached drawings, in which:

FIG. 1 is a top view of a substrate provided on one of its faces with a coating comprising a pattern with spatial modulation of at least one property of the coating, obtained according to the process of the invention, the lower part of FIG. 1 showing the electrical power of square wave type applied as input to the laser sources (Examples 1 and 2);

FIG. 2 is a top view of a substrate provided on one of its faces with a coating comprising a pattern with spatial modulation of at least one property of the coating, obtained according to the process of the invention, the lower part of FIG. 2 showing the electrical power of sinusoidal type applied as input to the laser sources (Example 3);

FIGS. 3 and 4 are top views of a substrate provided on one of its faces with a coating comprising a pattern with spatial modulation of at least one property of the coating, obtained according to the process of the invention comprising two successive heat treatment steps in two mutually perpendicular directions, so as to create a lattice, the lower part of FIGS. 3 and 4 showing the electrical power of square wave type applied as input to the laser sources for each heat treatment step (Examples 4 and 5).

In the examples, the quantities used are the following:
the light transmission, in the sense of standard NF EN 410, noted TL and expressed in %,
the light reflection, in the sense of standard NF EN 410, noted RL and expressed in %,
the square resistance, noted $R_c$ and expressed in ohms,
the normal emissivity at a temperature of 283 K, calculated according to standard EN 12898 from a reflection spectrum in the spectral range from 5 to 50 micrometers, noted $E_n$ and expressed in %.

EXAMPLE 1

A layer of titanium metal 6 nm thick is deposited on a main face of a substrate made of silico-sodio-calcic glass, obtained via the float process and then cut into a rectangular shape of length L=6 m and width λ=3.3 m, via the magnetron process using a titanium target, under an argon plasma.

The substrate thus coated is treated in air using a laser line formed by laser sources of InGaAs laser diode type, which are quasi-continuous sources emitting at a wavelength of between 900 nm and 1000 nm. The laser line has a length of 3.3 m, equal to the width λ of the substrate, and a mean width of 50 μm. The width of the laser line is uniform over the length of the line, such that the difference between the greatest width and the smallest width is 3% of the mean value, i.e. 1.5 μm.

The substrate is placed on a roll conveyor so as to travel in a direction X parallel to its length. The laser line is fixed and positioned above the coated face of the substrate with its longitudinal direction Y extending perpendicularly to the direction X of travel of the substrate, i.e. along the width of the substrate, extending over this entire width.

The position of the focal plane of the laser line is adjusted so as to be in the thickness of the titanium layer when the substrate is positioned on the conveyor, the mean power per unit area of the laser line at the focal plane being $10^5$ W/cm$^2$.

The substrate is made to travel under the laser line at a speed of 10 m/min, the speed not varying by more than 1 rel %. During the travel of the substrate under the laser line, a square wave electrical power $P_{elec}$ is applied as input to the laser diodes, as is seen at the bottom of FIG. 1, which shows the variation of $P_{elec}$ as a function of the time t. The period of the square wave signal $P_{elec}$(t) is 1.2 s and the pulse duration is 300 ms.

As shown in FIG. 1, a substrate is obtained whose coating comprises treated bands of titanium oxide with a width equal to 5 cm parallel to the length of the substrate, resulting from the oxidation of the layer of titanium metal in contact with the air when 100% of the power of the laser line is applied to the layer, which corresponds to the peaks of the square wave signal $P_{elec}$(t), these titanium oxide bands being alternated with untreated bands of titanium metal with a width equal to 15 cm parallel to the length of the substrate. The treated bands of titanium oxide have a light transmission TL of 83% and a light reflection RL of 12%, whereas the untreated bands of titanium metal have a light transmission TL of 42% and a light reflection RL of 23%. The coated substrate thus has a striped visual appearance.

EXAMPLE 2

As in Example 1, the heat treatment according to the invention is applied to a substrate made of silico-sodio-calcic glass, obtained via the float process and then cut into a rectangular shape of length L=6 m and width λ=3.3 m, which was coated on one of its main faces with a layer of titanium metal 6 nm thick, via the magnetron process using a titanium target under an argon plasma.

In Example 2, the laser line used for performing the heat treatment is formed by laser sources of Yb:YAG disc laser type coupled into an optical fiber of 300 µm core diameter, emitting at a wavelength of 1030 nm. The laser line has a length of 3.3 m, equal to the width λ of the substrate, and a mean width of 50 µm. The width of the laser line is uniform over the length of the line, such that the difference between the greatest width and the smallest width is 3% of the mean value, i.e. 1.5 µm.

As in Example 1, the substrate is placed on a roll conveyor so as to travel in a direction X parallel to its length. The laser line is fixed and positioned above the coated face of the substrate with its longitudinal direction Y extending perpendicularly to the direction X of travel of the substrate, i.e. along the width of the substrate, extending over this entire width.

The position of the focal plane of the laser line is adjusted so as to be in the thickness of the titanium layer when the substrate is positioned on the conveyor, the mean power per unit area of the laser line at the focal plane being $10^5$ W/cm$^2$.

The substrate is made to travel under the laser line at a speed of 10 m/min, the speed not varying by more than 1 rel %. During the travel of the substrate under the laser line, a square wave control voltage of the power $P_{elec}$ is applied as input to the laser sources, as is seen at the bottom of Figure which shows the variation of $P_{elec}$ as a function of the time t. The period of the square wave signal $P_{elec}$(t) is 1.2 s and the pulse duration is 300 ms.

A substrate as shown in FIG. 1 is thus obtained, whose coating comprises treated bands of titanium oxide with a width equal to 5 cm parallel to the length of the substrate, resulting from the oxidation of the layer of titanium metal in contact with the air when 100% of the power of the laser line is applied to the layer, which corresponds to the peaks of the square wave signal $P_{elec}$(t), these titanium oxide bands being alternated with untreated bands of titanium metal with a width equal to 15 cm parallel to the length of the substrate. The treated bands of titanium oxide have a light transmission TL of 83% and a light reflection RL of 12%, whereas the untreated bands of titanium metal have a light transmission TL of 42% and a light reflection RL of 23%.

EXAMPLE 3

As in Examples 1 and 2, the heat treatment according to the invention is applied to a substrate made of silico-sodio-calcic glass, obtained via the float process and cut into a rectangular shape of length L=6 m and width λ=3.3 m, which was coated on one of its main faces with a layer of titanium metal 6 nm thick, via the magnetron process using a titanium target under an argon plasma.

In Example 3, the laser line used for performing the heat treatment is formed by pulsed laser sources, with a pulse duration of 400 fs and a repeat rate of 500 kHz, emitting at a wavelength of 1040 nm. The laser line has a length of 3.3 m, equal to the width λ of the substrate, and a mean width of 50 µm. The width of the laser line is uniform over the length of the line, such that the difference between the largest width and the smallest width is 3% of the mean value, i.e. 1.5 µm.

The substrate is placed on a roll conveyor so as to travel in a direction X parallel to its length. The laser line is fixed and positioned above the coated face of the substrate with its longitudinal direction Y extending perpendicular to the direction X of travel of the substrate, i.e. along the width of the substrate, extending throughout this width.

The position of the focal plane of the laser line is adjusted so as to be in the thickness of the titanium layer when the substrate is positioned on the conveyor, the mean power per unit area of the laser line at the focal plane being $10^3$ W/cm$^2$.

The substrate is made to travel under the laser line at a speed of 10 m/min, the speed not varying by more than 1 rel %. During the travel of the substrate under the laser line, an electrical power $P_{elec}$ of sinusoidal type is applied as input to the laser sources, as is seen at the bottom of FIG. 2, which shows the variation of $P_{elec}$ as a function of the time t. The period of the sinusoidal signal $P_{elec}$(t) is 1.2 s, which makes it possible to temporally modulate the power of the pulses of the laser sources as shown schematically in FIG. 2 in which only a few pulses have been represented in the sinusoidal signal envelope.

As shown in FIG. 2, a substrate is obtained whose coating comprises a pattern with modulation of its light transmission TL and of its light reflection RL having a spatial periodicity of 15 cm, with a gradient of TL and RL alternately increasing and decreasing in the length direction of the substrate. The zones of highest TL, which have a TL equal to 83% and an RL equal to 12%, are titanium oxide bands resulting from the oxidation of the layer of titanium metal in contact with the air when 100% of the power of the laser line is applied to the layer, which corresponds to the peaks of the sinusoidal signal $P_{elec}$(t). The zones of lowest TL, which have a TL equal to 42% and an RL equal to 23%, are untreated bands of titanium metal, which corresponds to the troughs of the sinusoidal signal $P_{elec}(t)$.

EXAMPLE 4

A stack of thin layers comprising a silver layer, the said silver layer giving the glass low-emissivity properties, is deposited in a known manner via the magnetron process onto a main face of a substrate made of silico-sodio-calcic glass, obtained via the float process and then cut into a square shape with a side length of 3.3 m.

This stack comprises in order (from the substrate to the outer surface) the following layers of oxides, metals or nitrides, the geometrical thicknesses being indicated in parentheses:

Glass/$SnO_2$ (20 nm)/ZnO (15 nm)/Ag (8.5 nm)/Ni—Cr/ZnO (15 nm)/$Si_3N_4$ (25 nm).

In Example 4, the process comprises two successive heat treatment steps, the first step being identical to the treatment applied to the coated substrate in Example 1, with the substrate which travels parallel to one of its sides C1, and the second step also being identical to the treatment applied to the coated substrate in Example 1, but the substrate travelling this time parallel to another of its sides C2 perpendicular to the side C1. This second step is illustrated in FIG. 3.

As shown in FIG. 3, a substrate is obtained whose coating comprises a pattern with modulation of its properties in the form of a lattice, the strands of the lattice being treated strips with a width equal to 5 cm, which delimit between them untreated zones having a square shape with a side length of 15 cm. The treated strips have a square resistance $R_c$ of 4.5 Ω and a normal emissivity $\varepsilon_n$ of 5.0%, whereas the untreated zones have a square resistance $R_c$ of 5.5 Ω and a normal emissivity $\varepsilon_n$ of 6.0%. The glazing obtained thus has an openwork pattern of reflection of infrared radiation making it possible to control the gain in solar heat.

EXAMPLE 5

A layer of titanium metal 6 nm thick is deposited in a known manner via the magnetron process using a titanium target, under an argon plasma, onto a main face of a substrate made of silico-sodio-calcic glass, obtained via the float process and then cut into a square shape with a side length of 3.3 m.

As in Example 4, the process comprises two successive heat treatment steps. The first step is substantially identical to the treatment applied to the coated substrate in Example 1, with the substrate which travels parallel to one of its sides C1, except that the square wave electrical power $P_{elec}(t)$ which is applied as input to the laser diodes is the one visible at the bottom of FIG. 4, in which the period of the signal is 3 ms and the pulse duration is 300 µs. The second step is identical to the first step, but with the substrate which travels this time parallel to one of its other sides C2 perpendicular to the side C1. This second step is illustrated in FIG. 4.

As shown in FIG. 4, a substrate is obtained whose coating comprises a pattern with modulation of its electrical conductivity in the form of a lattice, the strands of the lattice being untreated strips with a width equal to 50 µm, which delimit between them treated zones having a square shape with a side length of 500 µm. The treated zones have a square resistance $R_c$ of 2000Ω, whereas the untreated strips have a square resistance $R_c$ of 400 Ω. The glazing obtained thus has a conductive grid on its surface.

The invention claimed is:

1. A process for obtaining a substrate provided, on at least part of at least one of its faces, with a coating comprising a pattern with spatial modulation of at least one property of the coating, the process comprising performing a heat treatment, using a laser radiation, of a continuous coating deposited on the substrate, in which the coating before heat treatment at least partially absorbs the laser radiation, the heat treatment being such that the substrate is irradiated with the laser radiation focused on the coating in the form of at least one laser line, keeping the coating continuous and without melting the coating, and during said heat treatment a relative displacement of the substrate and of the laser line focused on the coating in a direction transverse to a longitudinal direction of the laser line is performed while temporally modulating during the relative displacement a power of the laser line as a function of a speed of the relative displacement and of dimensions of the pattern in the relative displacement direction, wherein the power of the laser line is temporally modulated by temporally modulating an input electrical signal of each laser source forming the laser line, and wherein the laser line is formed using several independent laser sources, the temporal modulation of the input electrical signal being different from one laser source to another forming the laser line during the relative displacement.

2. The process according to claim 1, wherein the coating before heat treatment is monolayer.

3. The process according to claim 1, wherein the coating before heat treatment is a stack of layers, of which at least one layer at least partially absorbs the laser radiation.

4. The process according to claim 1, wherein the coating before heat treatment comprises at least one layer based on at least one metal, metalloid, oxide, nitride, carbide, sulfide, or any mixture thereof.

5. The process according to claim 1, wherein the longitudinal direction of the laser line is substantially perpendicular to the direction of relative displacement.

6. The process according to claim 1, wherein the laser line is fixed and the substrate is moved in translation in a transverse direction relative to the longitudinal direction of the laser line.

7. The process according to claim 1, wherein the pattern has a spatial periodicity and the frequency of temporal modulation of the input electrical signal of the laser source is equal to a ratio of the speed of relative displacement between the substrate and the laser line to the period of the pattern.

8. The process according to claim 1, wherein the temporal modulation of the input electrical signal of the laser source varies during the relative displacement of the substrate and of the laser line.

9. The process according to claim 1, wherein the laser line has a mean width of between 10 µm and 1000 µm.

10. The process according to claim 9, wherein the mean width is between 30 µm and 200 µm.

11. The process according to claim 1, wherein the mean power per unit area of the laser line in a focal plane is greater than or equal to $10^3$ W/cm$^2$.

12. The process according to claim 1, wherein each laser source forming the laser line is a continuous or quasi-continuous source.

13. The process according to claim 1, wherein each laser source forming the laser line is a pulsed source and the power of the emitted pulses is temporally modulated.

14. The process according to claim 1, wherein the laser line is fixed and the substrate has at least one first dimension and one second dimension which are mutually transverse, the process comprising at least one first step and one second step such that:
- in the first step, the substrate is moved in translation parallel to the first dimension and transversely to the longitudinal direction of the laser line, and the power of the laser line is temporally modulated;
- in the second step, the substrate is moved in translation parallel to the second dimension and transversely to the longitudinal direction of the laser line, and the power of the laser line is temporally modulated.

15. The process according to claim 1, wherein the speed of relative displacement is at least 3 meters per minute.

16. The process according to claim 1, wherein, during the heat treatment, the temperature of the face of the substrate that is opposite from the treated coating is less than or equal to 100° C.

17. The process according to claim 16, wherein, during the heat treatment, the temperature of the face of the substrate that is opposite from the treated coating is less than or equal to 50° C.

18. The process according to claim 17, wherein, during the heat treatment, the temperature of the face of the substrate that is opposite from the treated coating is less than or equal to 30° C.

19. The process according to claim 1, wherein the coating, once treated, comprises a pattern with spatial modulation of at least one property from among electrical conductivity, emissivity, radiation transmission, radiation reflection, radiation absorption, haze, colorimetric coordinates, hydrophilicity, photocatalytic activity of the coating.

20. The process according to claim 1, comprising, prior to performing the heat treatment, a depositing each layer of the coating onto the substrate.

21. A process for obtaining a substrate provided, on at least part of at least one of its faces, with a coating comprising a pattern with spatial modulation of at least one property of the coating, the process comprising performing a heat treatment, using a laser radiation, of a continuous coating deposited on the substrate, in which the coating before heat treatment at least partially absorbs the laser radiation, the heat treatment being such that the substrate is irradiated with the laser radiation focused on the coating in the form of at least one laser line, keeping the coating continuous and without melting the coating, and during said heat treatment a relative displacement of the substrate and of the laser line focused on the coating in a direction transverse to a longitudinal direction of the laser line is performed while temporally modulating during the relative displacement a power of the laser line as a function of a speed of the relative displacement and of dimensions of the pattern in the relative displacement direction,
wherein the laser line is formed using several independent laser sources that are controlled during the relative displacement so that the temporal modulation of the power of the laser line varies along the laser line during said displacement, thereby modulating the at least one property of the coating in a longitudinal direction of the laser line.

22. The process according to claim 21, wherein the power of the laser line is temporally modulated by temporally modulating an input electrical signal of each laser source forming the laser line.

* * * * *